United States Patent
Yae et al.

(10) Patent No.: US 10,320,910 B2
(45) Date of Patent: Jun. 11, 2019

(54) ELECTRONIC DEVICE IN VEHICLE, CONTROL METHOD THEREOF

(71) Applicant: Hyundai Motor Company, Seoul (KR)

(72) Inventors: Seong Soo Yae, Gyeonggi-do (KR); Soon Kwon Paik, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 145 days.

(21) Appl. No.: 14/964,934

(22) Filed: Dec. 10, 2015

(65) Prior Publication Data

US 2017/0034858 A1 Feb. 2, 2017

(30) Foreign Application Priority Data

Jul. 27, 2015 (KR) .................. 10-2015-0105565

(51) Int. Cl.
*H04L 29/08* (2006.01)
*H04W 76/14* (2018.01)
*H04W 8/00* (2009.01)

(52) U.S. Cl.
CPC .............. *H04L 67/12* (2013.01); *H04L 67/16* (2013.01); *H04W 76/14* (2018.02); *H04W 8/005* (2013.01)

(58) Field of Classification Search
CPC ....... H04L 67/12; H04L 67/16; H04W 76/023
See application file for complete search history.

(56) References Cited

U.S. PATENT DOCUMENTS

| | | | |
|---|---|---|---|
| 2007/0140187 A1* | 6/2007 | Rokusek | H04L 67/16 370/338 |
| 2014/0306833 A1* | 10/2014 | Ricci | B60Q 1/00 340/901 |
| 2016/0381717 A1* | 12/2016 | Sunagar | H04B 17/318 370/328 |

FOREIGN PATENT DOCUMENTS

| | | |
|---|---|---|
| JP | 4328706 | 6/2009 |
| JP | 2010-503262 | 1/2010 |
| JP | 2010-58664 | 3/2010 |
| JP | 2014-133506 | 7/2014 |
| KR | 10-1160024 | 6/2012 |
| KR | 10-116351 | 7/2012 |
| KR | 10-2013-0054030 | 5/2013 |
| KR | 10-2014-0136068 A | 11/2014 |
| KR | 10-1513643 | 4/2015 |
| KR | 10-2015-0065004 A | 6/2015 |

* cited by examiner

*Primary Examiner* — Jackie Zuniga Abad
(74) *Attorney, Agent, or Firm* — Mintz Levin Cohn Ferris Glovsky and Popeo, P.C.; Peter F. Corless (57) ABSTRACT

A method for controlling an electric device in a vehicle includes: establishing communication with a first mobile device previously recognized by the vehicle; collecting first pattern information from the vehicle; comparing the first pattern information with second pattern information stored in the first mobile device; and discovering a second mobile device based on the comparison of the first pattern information with the second pattern information.

21 Claims, 6 Drawing Sheets

ELECTRONIC DEVICE IN VEHICLE, CONTROL METHOD THEREOF

CROSS-REFERENCE TO RELATED APPLICATION

This application claims priority to and the benefit of Korean Patent Application No. 10-2015-0105565, filed on Jul. 27, 2015 in the Korean Intellectual Property Office, the disclosure of which is hereby incorporated by reference as if fully set forth herein.

TECHNICAL FIELD

The disclosure relates generally to an electronic system for use in a vehicle, and more particularly to a device and a method, adapted in a vehicle, for communicating with a mobile terminal.

BACKGROUND

Electronic control technology has developed rapidly as of late. Even in vehicles, various devices which were previously operated mechanically are now electrically controlled, thereby increasing convenience and safety for the driver (e.g., operator).

Similarly, communication technology has been rapidly developed for communication between mobile devices, between a vehicle and a mobile device, and between vehicles. For example, a vehicle can communicate with a mobile device via Wi-Fi, Bluetooth, and etc.

When a vehicle wirelessly connects with a mobile device, various services via communication between the vehicle and the mobile device can be provided. However, the vehicle can be connected to a mobile device owned by passenger only, not a driver, for safety concerns. In this case, while driving, the driver is restricted from using various services, such as hands-free services, based on communication between the vehicle and the mobile device.

SUMMARY

According to the present disclosure, an electric device in a vehicle can be provided for communicating with driver's mobile device. A method for engaging a vehicle with the driver's mobile device can be performed based on pattern information of the vehicle even if the vehicle has been previously connected to a passenger's mobile device. Further, an electric device can be included in a vehicle for collecting pattern information of the vehicle to thereby provide convenience for the driver.

According to embodiments of the present disclosure, a method for controlling an electric device in a vehicle includes: establishing communication with a first mobile device previously recognized by the vehicle; collecting first pattern information from the vehicle; comparing the first pattern information with second pattern information stored in the first mobile device; and discovering a second mobile device based on the comparison of the first pattern information with the second pattern information.

When the second mobile device is discovered, the electric device stops the communication with the first mobile device, arranges communication with the second mobile device, compares the first pattern information with third pattern information stored in the second mobile device, and maintains the established communication with the second mobile device based on the comparison of the first pattern information with the third pattern information.

When the first pattern information is correlated with the third pattern information, the third pattern information can be updated based on information collected while the vehicle runs or stops.

The communication with the first mobile device is established via one of wired communication technology and wireless communication technologies including Wi-Fi, Bluetooth, ZigBee, and Near Field Communication (NFC).

While the first pattern information is collected from the vehicle, driving pattern information as well as manipulation pattern information can be collected.

The driving pattern information includes at least one of: a destination inputted to an audio-video-navigation device, information of an area adjacent to a driving route, an operation mode of the audio-video-navigation device on the driving route, a driving speed, an accelerator manipulation pattern, and a break manipulation pattern.

The manipulation pattern information includes at least one of: integrated memory system (IMS) information, power steering wheel setting information, and mirror setting information.

When the driving pattern information and the manipulation pattern information are beyond predetermined standards, it is recognized that the first pattern information and the second pattern information are uncorrelated.

In order to compare the first pattern information with the second pattern information, a statistical model can be used to analyze the driving pattern information and the manipulation pattern information.

When the second mobile device is undiscovered, a message questioning whether the second mobile device is in the vehicle is provided for a driver or operator.

Furthermore, according to embodiments of the present disclosure, a method for controlling an electric device in a vehicle includes: registering at least one mobile device in the electric device; collecting vehicle pattern information from the vehicle when the at least one mobile device is available for communicating with the electric device and the at least one mobile device does not include the vehicle pattern information; and storing the vehicle pattern information in the at least one mobile device.

Furthermore, according to embodiments of the present disclosure, an apparatus in a vehicle includes: a communication unit configured to communicate with a first mobile device; a controller configured to collect first pattern information from the vehicle; and a memory configured to store the first pattern information. The controller is further configured to compare the first pattern information with second pattern information stored in the first mobile device and discover a second mobile device based on the comparison of the first pattern information with the second pattern information.

When the second mobile device is discovered, the controller is further configured to stop communication with the first mobile device, establish communication with the second mobile device, compare the first pattern information with third pattern information stored in the second mobile device, and maintain the established communication with the second mobile device based on the comparison of the first pattern information with the third pattern information.

When the first pattern information is correlated with the third pattern information, the controller is further configured to update the third pattern information based on information collected while the vehicle runs or stops.

The controller is further configured to control the communication unit to establish communication with the first mobile device via one of wired communication technology such as a USB cable connection and wireless communication technologies including Wi-Fi, Bluetooth, ZigBee, and Near Field Communication (NFC).

The first pattern information can include driving pattern information and manipulation pattern information.

The driving pattern information includes at least one of: a destination inputted to an audio-video-navigation device, information of an area adjacent to a driving route, an operation mode of the audio-video-navigation device on the driving route, a driving speed, an accelerator manipulation pattern, and a break manipulation pattern.

The manipulation pattern information includes at least one of: integrated memory system (IMS) information, power steering wheel setting information, and mirror setting information.

When the driving pattern information and the manipulation pattern information are beyond predetermined standards, the controller is further configured to recognize that the first pattern information and the second pattern information are uncorrelated.

The controller is further configured to use a statistical model to analyze the driving pattern information and the manipulation pattern information.

The electric device includes a display unit so that, when the second mobile device is undiscovered, the controller is further configured to provide a message questioning whether the second mobile device is in the vehicle on the display unit.

Furthermore, according to embodiments of the present disclosure, an apparatus in a vehicle includes: a communication unit configured to communicate with at least one mobile device; and a controller configured to register the at least one mobile device and collect vehicle pattern information from the vehicle when the at least one mobile device is available for communicating with the electric device and the at least one mobile device does not include the vehicle pattern information. The controller is further configured to control the communication unit to store the vehicle pattern information in the at least one mobile device.

Advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Reference will now be made in detail to the embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e., open transition). The term "coupled" or "operatively coupled" as used herein, is defined as connected, although not necessarily directly, and not necessarily mechanically.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

Figure 1:
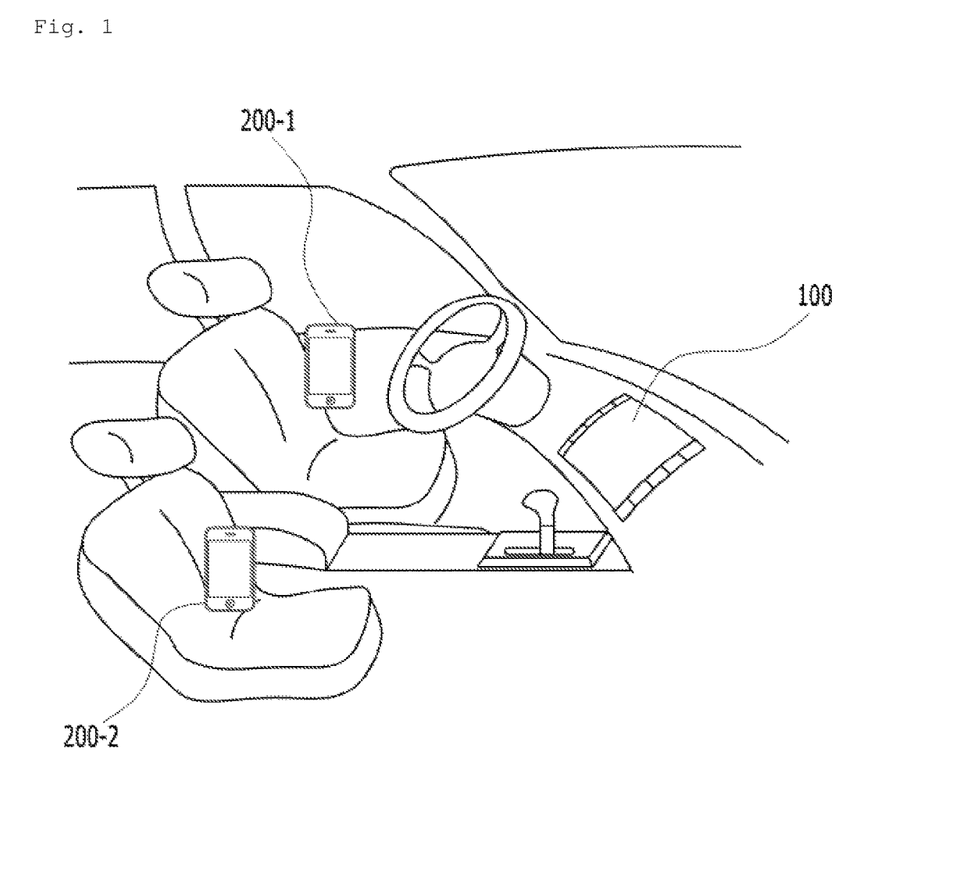
FIG. 1 shows communication system in a vehicle.

Referring now to the disclosed embodiments, FIG. 1 shows communication system in a vehicle.

As shown, an electric device 100 adapted in the vehicle can communicate with a first mobile device 200-1 or a second mobile device 200-2. The electric device 100 can be engaged with the first and the second mobile devices, 200-1, 200-2, in manner of wired communication technology or wireless communication technologies including Wi-Fi, Bluetooth, ZigBee, Near Field Communication (NFC), and the like.

By way of example but not limitation, the electric device 100 can include a headup unit, more particularly an audio-video-navigation (AVN) device.

When the vehicle is being driven (i.e., accessory-on state or ignition state), the electric device 100 can try to discover mobile device which is available to communicate with, and arrange communication with the available mobile device. By way of example but not limitation, the electric device 100 can be engaged with the last mobile device which was communicated with.

Hereinafter, it is assumed that the electric device 100 is engaged with the second mobile device 200-2 for communication when the vehicle is in accessory-on state.

In a case when the electric device 100 is engaged with (i.e., in communication with) the second mobile device 200-2 instead of the first mobile device 200-1, the electric device 100 cannot provide to the first mobile device 200-1 various services based on the communication between them. For example, against calls transmitted from or received by the first mobile device 200-1, the electric device 100 cannot provide a hands-free service, a navigation service, a telematics service, and etc. For various services such as a hands-free service, a navigation service, and a telematics service, the electric device 100 can be communicated with the first mobile device 200-1.

While engaged with the second mobile device 200-1, the electric device 100 collects pattern information of vehicle. The pattern information of vehicle can include driving pattern information and manipulation pattern information. By the way of example but not limitation, the driving pattern information includes at least one of destination inputted to an audio-video-navigation device, area information adjacent to a driving route, operation mode of the audio-video-navigation device on the driving route, driving speed, accelerator manipulation pattern, break manipulation pattern, and so on. That is, the driving pattern information can includes a kind of plural variable/changeable data caused by driver's/operator's handling while the driver/operator runs a vehicle. Further, the manipulation pattern information includes at least one of integrated memory system (IMS) information, power steering wheel setting information, mirror setting information, and the like. Namely, the manipulation pattern information can include a kind of plural data caused by driver's/operator's given input (e.g., button selection) while the driver/operator runs a vehicle.

The electric device 100 collects pattern information from the vehicle for a predetermined time, and compares the collected data with pattern information stored in the second mobile device 200-2. By the way of example but not limitation, the pattern information can be stored in each mobile device 200-1, 200-2 as well as the vehicle or a network service accessed via internet.

The electric device 100 analyzes the collected pattern data of vehicle and the pattern information stored in the second mobile device 200-2 to determine whether the collected pattern data and the stored pattern information are correlated or not.

The electric device 100 can search available mobile device again, and arranges communication with the first mobile device 200-1. Then the electric device 100 compares the collected pattern information with pattern information stored in the first mobile device 200-1. Based on the result of the comparison, the electric device 100 can keep the arrangement of communication with the first mobile device 200-1.

Hereinafter, referring to a block diagram, a communication system adapted in a vehicle is described in detail.

Figure 2:
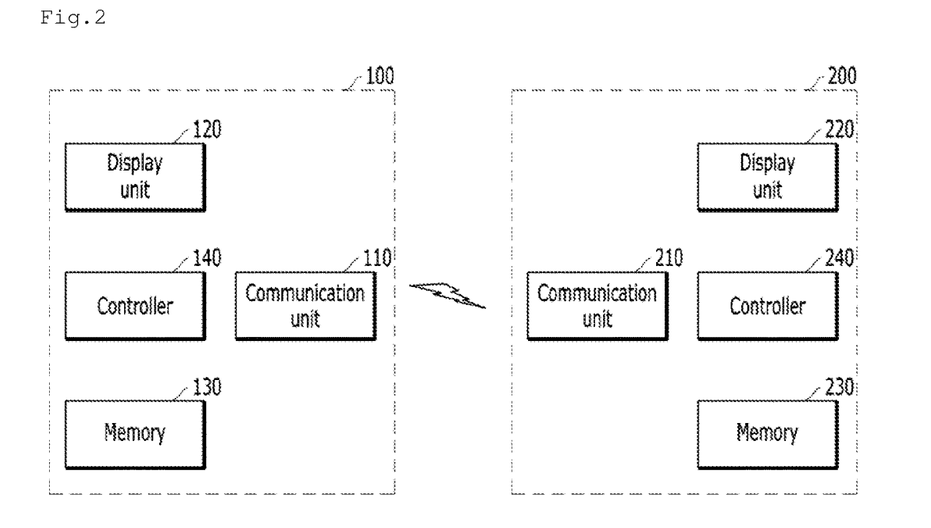
FIG. 2 describes an electric device adapted in a vehicle and a mobile device engaged with the electric device.

FIG. 2 describes an electric device adapted in a vehicle and a mobile device engaged with the electric device.

As shown, the electric device 100 adapted in the vehicle can include a communication unit 110, a display unit 120, a memory 130, and a controller 140.

The electric device 100 can include, or be engaged with, a module for telematics services so as to couple with a network server or a service center. The electric device 100 can be engaged with external center via the communication unit 110. The electric device 100 can communicate with an electric control unit (ECU) included in the vehicle through a Controller Area Network (CAN), Ethernet, or etc.

The communication unit 100 can be used for communicating with other devices, servers, or centers not described above. The communication unit 100 can perform to communicate with a mobile device 200 located in the vehicle. The communication unit 100 can include various modules (e.g., USB) for wired communication. Further, the communication unit 100 can include various modules operable to perform wireless communication technologies including Wi-Fi, Bluetooth, ZigBee, Near Field Communication (NFC), and the like, to thereby communicate with the mobile device 200.

The electric device 100 can search the mobile device 200 which is available for wired/wireless communication, when the vehicle is ignited or accessories inside the vehicle is turned on. By the way of example but not limitation, the communication unit 110 in the electric device 100 can search the last mobile device communicated with. For example, the electric device 100 can have a priority (or weight) of each mobile device, and try to arrange communication with mobile devices based on the priority (e.g., from the highest to the lowest).

The display unit 120 can include at least one of a liquid crystal display (LCD), a thin film transistor-liquid crystal display (TFT LCD), an organic light-emitting diode (OLED), a flexible display, a 3D display, an e-ink display, etc.

Generally, the display unit 120 can be included in an audio-video-navigation (AVN) device. However, the display unit 120 can be located at the front of passenger seat or back seat. A plurality of display units 120 can be included in a single vehicle.

The memory 130 can include at least one type of memories or recoding medium including a flash memory, a hard disk, a solid state disk (SSD), a silicon disk drive (SDD), a multimedia card (MMC), a multimedia micro card, a Secure Digital (SD) card, an xD-Picture Card, a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, and so forth.

The memory 130 can be operable for web storage storing data on Internet. By the way of example but not limitation, the web storage can be located at external center or server.

The controller 140 can store information about plural mobile devices in the memory 130. The controller 140 can determine priority of plural mobile devices and assign corresponding priority to each of plural mobile devices.

The controller 140 can collect pattern information of vehicle. The pattern information of vehicle can include driving pattern information and manipulation pattern information.

The driving pattern information can includes a type of plural data adjusted by characteristic driver's/operator's handling while the driver/operator runs a vehicle.

The driving pattern information can include destination inputted to an audio-video-navigation device. By the way of example but not limitation, the destination can include at least one of the last location information, the highest frequent location information, location information stored by a driver/operator, location information for geo-fencing, and so forth.

The driving pattern information can include area information adjacent to a driving route. The driving pattern information can correspond with each driver/operator, and be stored in a mobile device owned by each driver/operator.

The driving pattern information can include telephone numbers frequently used by a driver/operator.

The driving pattern information can include operation mode of the audio-video-navigation device on the driving route. For example, the operation mode can include FM/AM radio frequency list including radio channels used during daily time period, or frequently used audio sources such as USB, iPod, MP3, JukeBox, etc.

The driving pattern information can include driving speed, accelerator manipulation pattern, break manipulation pattern, and so forth. The driving pattern information can include other circumstantial information such as internal temperature during driving, frequent driving hours, and the like.

The manipulation pattern information can include a kind of plural data caused by driver's/operator's given input such as button selection or seat adjustment while the driver/operator runs a vehicle.

By the way of example but not limitation, the manipulation pattern information includes at least one of integrated memory system (IMS) information including seat adjustment for personal convenience or preference based on driver's/operator's habit, body type, etc.

The manipulation pattern information can include power steering wheel setting information, mirror setting information, and the like.

After the arrangement for communication with the first mobile terminal 200-1, the controller 140 collects pattern information of vehicle during a predetermined time. The collected pattern information can be stored in the memory 130, or transmitted to the first mobile terminal 200-1.

When the first mobile terminal 200-1 communicated with the electric device 100 stores certain pattern information, the controller 140 receives the pattern information from the first mobile terminal 200-1. The pattern information transferred from the first mobile terminal 200-1 can be analyzed and compared with pattern information collected from vehicle for a predetermined time.

For example, the controller 140 can compare the collected pattern information from vehicle with the stored pattern information from the first mobile device 100. By the way of example but not limitation, each element of the pattern information can be converted into a numerical value (or digitized), and a virtual weight based on priority can be assigned to each element of the pattern information. Calculations based on numerical value and virtual weight of the collected and stored pattern information can be compared. If difference between the calculations is within a predetermined range, it can be determined that the collected and stored pattern information is correlated. Otherwise, it can be determined that the collected and stored pattern information is not correlated.

Further, the controller 140 can use a statistical model to analyze, and compare, the collected and stored pattern information.

When the controller 140 determines that the pattern information collected from the vehicle is not correlated with the pattern information stored in the first mobile device 200, the controller 140 can search, or wait for, another mobile device.

As described above, among at least one mobile device available to communicate with the electric device 100, the controller 140 tries to find a mobile device including the pattern information correlated with pattern information collected from the vehicle for a predetermined period.

If driver's/operator's mobile device is the second mobile device, the controller 140 can keep the arrangement for communicating with the second mobile device.

When the controller 140 is engaged with a mobile device newly registered, the controller 140 can store pattern information for each mobile terminal, like a database. The controller 140 can store the corresponding information in the memory 130, and/or transmit it to the newly registered mobile device in order that the newly registered mobile device can store the pattern information.

If the first mobile device 100 does not include any pattern information, the controller 140 can transmit the collected pattern information to the first mobile device 100.

The mobile device 200 available for communicating with the electric device 100 in the vehicle can include a communication unit 210, a display unit 220, a memory 230, and a controller 240.

Herein, the mobile device 200 can include a mobile phone, a smart phone, a laptop computer, a terminal for digital broadcasting, a personal digital assistant (PDA), a portable multimedia play (PMP), a navigation device, a slate personal computer, a tablet, an ultrabook, a wearable device such as a smartwatch, a smart glass or a head-mounted display (HMD), and so forth. However, according to embodiments of the present disclosure, the electric device 100 in the vehicle can be engaged with a digital TV, a desktop computer, a digital signage, etc.

When the pattern information provided by the electric device 100 in the vehicle correlates with the pattern information stored in the mobile device 200, the mobile device 200 updates the pattern information based on the collected pattern information transferred from the vehicle. The updated pattern information can be stored in the memory 230.

If the pattern information collected by the electric device 100 in the vehicle does not correlate with the pattern information stored in the mobile device 200, the mobile device 200 does not store the collected pattern information even if the collected pattern information is transferred from the vehicle to the mobile device 200. It is because the mobile device 200 is not considered driver's/operator's mobile device.

The controller 140 has a supervisor mode to dominantly control the operation of the electric device 100 and the mobile device 200. If some of the pattern information collected from the vehicle can be stored in the mobile device 200, the controller 140 predominantly controls the electric device 100 and the mobile device 200 so that the mobile device 200 stores the required pattern information. Particularly, if pattern information collected from the vehicle does not correlate with pattern information stored in an engaged mobile device when the engaged mobile device is driver's/operator's mobile device, the controller 140 can operate in the supervisor mode. However, the supervisor mode of the controller 140 can be limited under a security policy.

Figure 3:
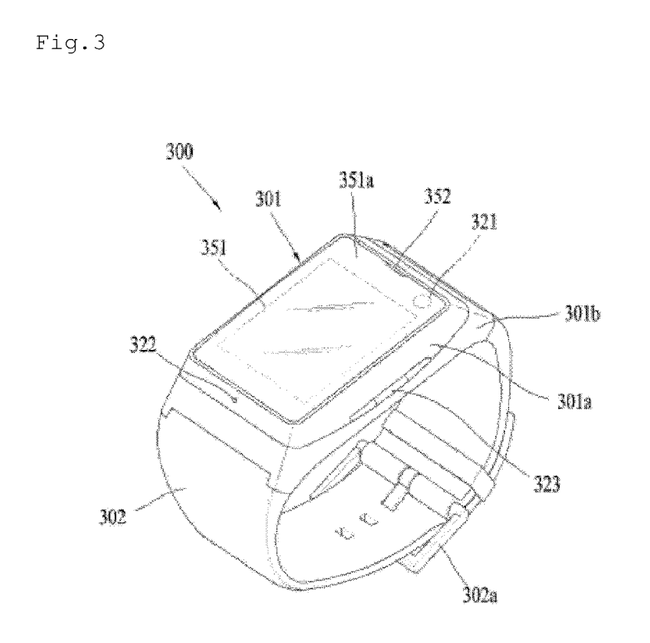
FIG. 3 shows a watch-styled mobile device operable for engagement with an electric device for use in a vehicle.

FIG. 3 shows a watch-styled mobile device operable for engagement with an electric device for use in a vehicle.

As shown, a watch-styled mobile device 300 includes a member 301 having a display unit 351 and a band 302 connected to the member 301 configured to make the member 301 wearable on driver's/operator's wrist.

The member 301 includes a case as an exterior. Referring to FIG. 3, the case includes first and second cases 301a, 301b determining a room for various electronic modules. By the way of example but not limitation, the watch-styled mobile device 300 can be composed of a single case containing various electronic modules.

The watch-styled mobile device 300 can wirelessly communicate with another device, and the member 301 can include an antenna for wireless communication. The antenna can be formed of a case. For example, when a case including a conductive material is electrically connected to an antenna, the case can be functioned as a part of antenna for expanding a radiation pattern or a ground plane.

The display unit 351 arranged at the front of the member 301 can show information, and the display unit 351 can include a touch sensor like a touch screen. Referring to FIG. 3, a window 351a of the display unit 351 installed on the first case 301a, the window 351a with the first case 301a can form the front surface of the member 301.

The member 301 can include a sound output unit 352, a camera 321, a micro phone 322, an input unit 323, and so forth. If the display unit 351 is formed of a touch screen, the display unit 351 can operate as the input unit 323, and the member 301 can exclude a button, a key, or any given means adjustable by an owner.

The band 302 can surround owner's wrist for putting the member 301 thereon. For convenience, the band 302 can include a flexible material. By the way of example but not limitation, the band 302 can include a leather, a rubber, a silicon, a synthetic resins, and so forth. Further, the band 302 can be detachable from the member 301, and the band 302 can be replaced with another according to owner's preference.

The band 302 can be used for improving or enhancing performance of an antenna, if including a conductive material. For example, the band 302 can include expanded units (not shown) electrically coupled to the antenna in order to expand a radiation pattern or a ground plane.

The band 302 can include a fastener 302a. The fastener 302a can include a buckle, a hook for snap-fit, a Velcro, and so forth. The fastener 302a can include an elastic material. In FIG. 3, the fastener 302a includes a buckle.

Figure 4:
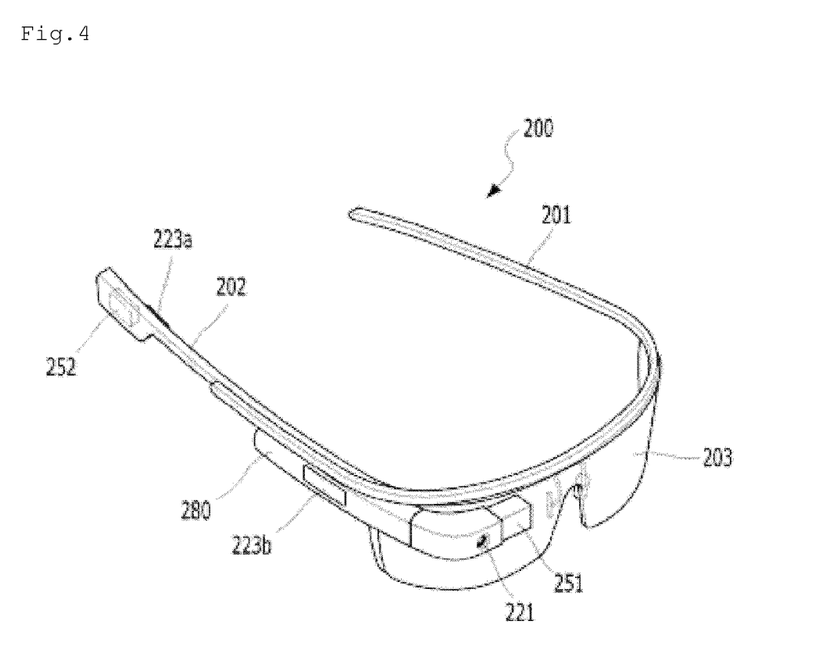
FIG. 4 shows a glass-styled mobile device operable for engagement with an electric device for use in a vehicle.

FIG. 4 shows a glass-styled mobile device operable for engagement with an electric device for use in a vehicle. The glass-styled mobile device is called a smart glass.

As shown, a smart glass 500 wearable on owner's head can include a frame unit (e.g., a case, housing, etc.). The frame unit can include a flexible material. In FIG. 4, the frame unit includes a first frame 201 and a second frame 202, each having a material different from each other.

The frame unit can be supported by owner's head, and include a room for various modules. Referring to FIG. 4, a control module 280, a sound output module 252, and etc. can be included in the frame unit. A lens 203 covering one of owner's eyes can be detachable from the frame unit.

The control module 280 is configured to control various electronic devices included in the smart glass 500. For example, the control module 280 controls a wireless communication unit (not shown) of the smart glass 500 so as to form a wireless channel for wireless communication with an audio-video-navigation (AVN) device in a vehicle. Throughout the wireless channel, information related to vehicle driving or safety can be asked or transmitted. Further, the control module 280 shows the transmitted information on a display unit 251. The control module 280 can recognize owner's eye line via a camera 221 installed for capturing owner's view. The control module 280 can use the recognized owner's eye line from the camera 221 and a gyro sensor (not shown) in order to determine whether a driver/operator keeps eyes forward.

Referring again to FIG. 4, the control module 280 is located in the frame unit on one of right and left side, but the control module 180 can be located in both sides.

The display unit 251 can include a head-mounted display (HMD). A head-mounted display (or helmet-mounted display, for aviation applications), both abbreviated HMD, is a kind of display device, worn on the head or as part of a helmet, that has a small display optic in front of one (i.e., monocular HMD) or each eye (i.e., binocular HMD). When a user wears the smart glass 500, the display unit 251 can be arranged at the front of at least one of right eye and left eye so that an image or information can be shown at the front of user's eye. In FIG. 4, the display unit 251 is positioned at the front of user's right eye.

The display unit 251 can use a prism to project an image on user's eye. The prism can be transparent so that a user can recognize an image formed by the prism as well as user's front view simultaneously.

An image shown throughout the display unit 251 can be overlapped by user's front view. The smart glass 500 can help driver or operator to keep eyes forward without interference while the driver or operator selects or adjusts driving operations or options adapted in a vehicle.

The camera 221 locates adjacent to at least one of driver's or operator's right and left eyes, and captures front images. Since located closed to at least one of driver's eye, the camera 221 can capture driver's front view.

Referring once again to FIG. 4, the camera 221 is included in the control module 280. However, the camera 221 can be located at another position. The smart glass 500 can include plural of cameras 221 to obtain a stereoscopic image. Further, the smart glass 500 can include a camera (not shown) installed at direction opposite to driver's eye line. The camera can capture an image for tracking a pupil of driver's eye so as to recognize driver's eye line.

The smart glass 500 can include control input units 223a, 223b configured to receive an instruction or user's manipulation. The control input units 223a, 223b can be manipulated by user's touch, push, or etc.

Figure 5:
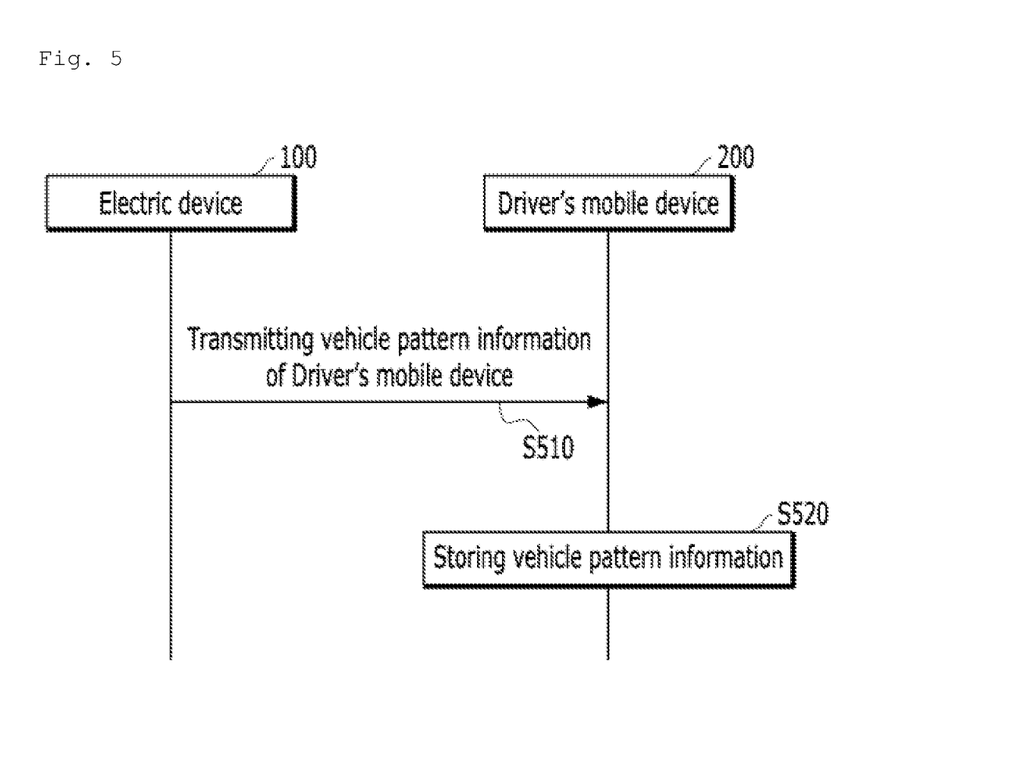
FIG. 5 describes data transmission between driver's mobile device and an electric device in a vehicle.

FIG. 5 describes data transmission between driver's mobile device and an electric device in a vehicle.

As shown, the electric device 100 transfers corresponding vehicle pattern information to driver's mobile device 200 (S510).

After the electric device 100 and driver's mobile device 200 are arranged for communication, if driver's mobile device 200 does not have any vehicle pattern information, the electric device 100 transmit to driver's mobile vehicle pattern information collected after the vehicle starts (accessary-on or ignition state).

Driver's mobile device 200 can store the transmitted vehicle pattern information (S520). Driver's mobile device 200 can include an application program related to collecting vehicle pattern information, which can be downloaded from an application provider/market.

Figure 6:
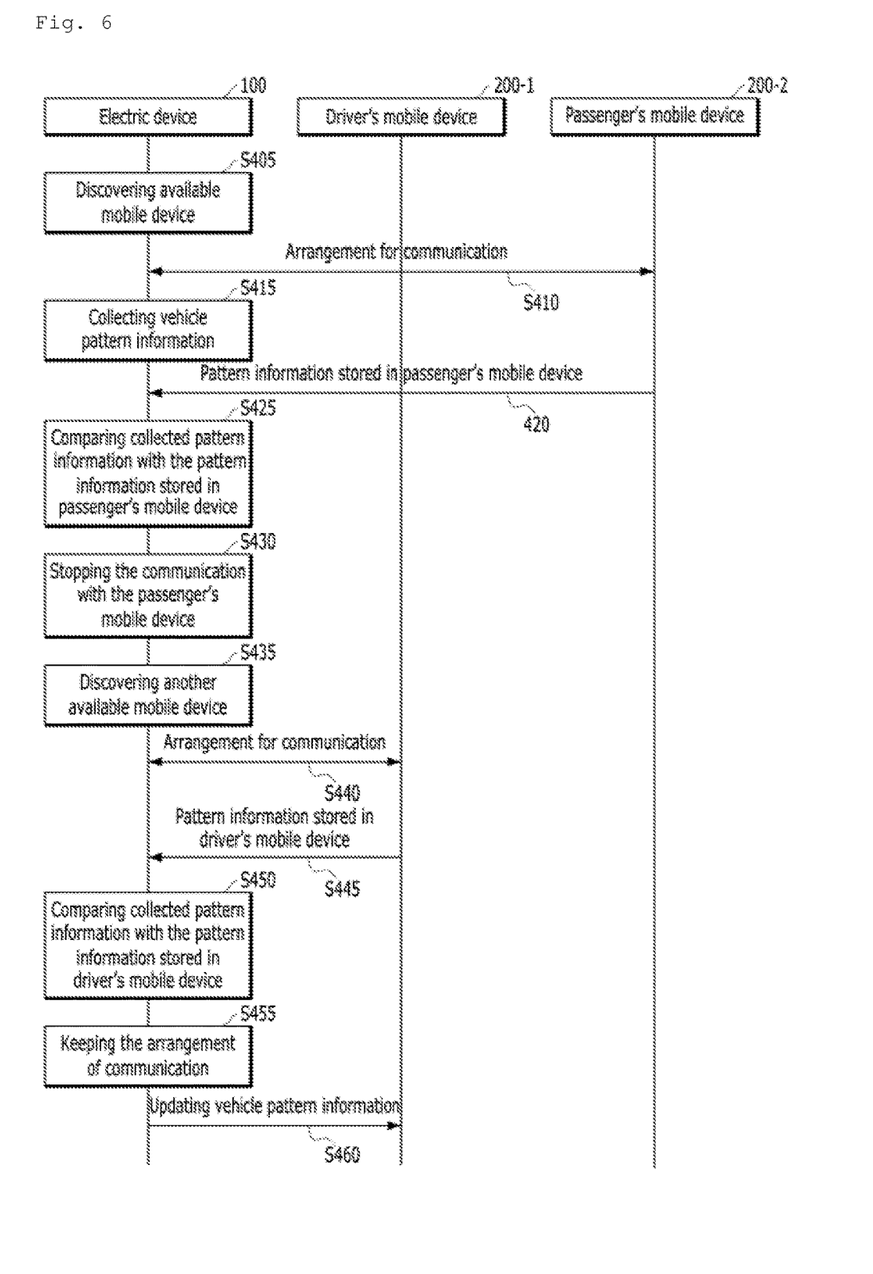
FIG. 6 describes engagement between driver's mobile device and an electric device in a vehicle, based on pattern information of vehicle.

FIG. 6 describes engagement between driver's mobile device and an electric device in a vehicle, based on pattern information of vehicle.

The electric device 100 discovers a mobile device available for communication (S405).

It is assumed that the electric device 100 is first engaged with passenger's mobile device 200-2 for communication. The electric device 100 can discover the last engaged mobile terminal before the vehicle starts, and passenger's mobile device 200-2 can be discovered first. The electric device 100 can search a mobile device according to various priorities.

After establishing communication with passenger's mobile device 200, the electric device 100 collects vehicle pattern information (S415).

The electric device 100 can gather vehicle pattern information, i.e., driving pattern information and manipulation pattern information. By the way of example but not limitation, the vehicle pattern information can include any other data or information which can be unique or distinguishable for each driver or operator.

After collecting the vehicle pattern information for a predetermined time, the electric device receives pattern information stored in passenger's mobile device (S420).

For example, the electric device 100 can receive the pattern information stored in passenger's mobile device before collecting the vehicle pattern information.

The electric device 100 compares collected pattern information with the pattern information stored in passenger's mobile device (S425).

When the electric device 100 determines that the collected pattern information does not correlate with the pattern information stored in passenger's mobile device, the electric device 100 stops the communication with the passenger's mobile device (S430).

The electric device 100 discovers another available mobile device (S435).

If engaged with driver's mobile device for communication, the electric device 100 receives pattern information stored in driver's mobile device (S445).

The electric device 100 compares collected pattern information with the pattern information stored in driver's mobile device (S450).

Since the collected pattern information correlate with the pattern information stored in driver's mobile device, the electric device 100 keeps the arrangement of communication with driver's mobile device (S455).

The electric device 100 updates vehicle pattern information stored in driver's mobile device 200-1 based on the collected vehicle pattern information (S460). For example, when the driver changes a driving route on a navigation device, the electric device 100 updates driver's mobile device 200-1 based on the changed driving route. Further, though the driver run the vehicle for 8:00 AM to 10:00 AM generally, the driver run the vehicle until 11:00 AM, then the electric device 100 updates driving hours stored in driver's mobile device 200-1. If the driver had run the vehicle about 30 km/h on average in a downtown area but recently has changed an average speed up to 50 km/h in the downtown area, an average speed stored in driver's mobile device would be updated. Though the driver has listened to a particular radio channel FM 89.1 during commuting hours, the driver change a radio channel FM 91.9, then the electric device 100 updates driver's preference stored in driver's mobile device. Further, if the driver changes values for seat adjustment, the corresponding data would be updated. Plural information described above is suggested for the way of example but not limitation. Various information can be used and updated for checking whether an engaged mobile device is driver's one.

When the electric device 100 discovers no mobile device available for communication, the electric device 100 shows on AVN display a message questioning whether a driver has an available mobile device. By the way of example but not limitation, the message can be delivered via a voice/sound.

As above described, embodiments of the present disclosure can provide an electric device operable to communicate with driver's mobile device so as to improve driver's convenience for driving. Further, even if the passenger's mobile device is first engaged with the vehicle, the electric device collects pattern information from the vehicle, discovers which one is the driver's mobile device, and keeps an arrangement for communication with driver's mobile device so that driver's convenience, driver's safety, or device efficiency can be enhanced and improved.

The aforementioned embodiments are achieved by combination of structural elements and features of the present disclosure in a predetermined manner. Each of the structural elements or features can be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in other embodiments, or may be replaced with corresponding structural elements or features of other embodiments. Moreover, it will be apparent that some claims referring to specific claims may be combined with another claims referring to the other claims other than the specific claims to constitute the embodiments or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

It will be apparent to those skilled in the art that various modifications and variations can be made in the present disclosure without departing from the spirit or scope of the disclosures. Thus, it is intended that the disclosure covers the modifications and variations of this disclosure provided they come within the scope of the appended claims and their equivalents.

What is claimed is:

1. A method for controlling an electric device in a vehicle, the method comprising:
    establishing communication with a first mobile device previously recognized by the vehicle;
    collecting first pattern information including information relating to driving of the vehicle or to manipulation of the vehicle from the vehicle;
    comparing the first pattern information collected from the vehicle with second pattern information including information relating to driving of the vehicle or to manipulation of the vehicle stored in the first mobile device;
    discovering a second mobile device when the first pattern information collected from the vehicle does not correlate with the second pattern information stored in the first mobile device; and
    when the second mobile device is discovered, stopping the communication with the first mobile device.

2. The method according to claim 1, further comprising:
when the second mobile device is discovered,
establishing communication with the second mobile device;
comparing the first pattern information with third pattern information stored in the second mobile device; and
maintaining the established communication with the second mobile device based on the comparison of the first pattern information with the third pattern information.

3. The method according to claim 2, further comprising:
when the first pattern information is correlated with the third pattern information, updating the third pattern information based on information collected while the vehicle runs or stops.

4. The method according to claim 1, wherein the establishing of communication with the first mobile device is performed via one of wired communication technology and wireless communication technologies including Wi-Fi, Bluetooth, ZigBee, and Near Field Communication (NFC).

5. The method according to claim 1, wherein the collecting of the first pattern information from the vehicle comprises:
collecting driving pattern information; and
collecting manipulation pattern information.

6. The method according to claim 5, wherein the driving pattern information includes at least one of: a destination inputted to an audio-video-navigation device, information of an area adjacent to a driving route, an operation mode of the audio-video-navigation device on the driving route, a driving speed, an accelerator manipulation pattern, and a break manipulation pattern.

7. The method according to claim 5, wherein the manipulation pattern information includes at least one of: integrated memory system (IMS) information, power steering wheel setting information, and mirror setting information.

8. The method according to claim 5, wherein the comparing of the first pattern information with the second pattern information further comprises:
when the driving pattern information and the manipulation pattern information are beyond predetermined standards, recognizing that the first pattern information and the second pattern information are uncorrelated.

9. The method according to claim 8, wherein the comparing of the first pattern information with the second pattern information further comprises:
using a statistical model to analyze the driving pattern information and the manipulation pattern information.

10. The method according to claim 1, further comprising:
when the second mobile device is undiscovered, providing a message questioning whether the second mobile device is in the vehicle.

11. The method according to claim 1, wherein the stopping of the communication with the first mobile device comprises stopping the communication with the first mobile device, which is different from the second mobile device, when the second mobile device is discovered.

12. A method for controlling an electric device in a vehicle, the method comprising:
registering a first mobile device in the electric device;
collecting vehicle pattern information including information relating to driving of the vehicle or to manipulation of the vehicle from the vehicle when the first mobile device is available for communicating with the electric device and the first mobile device does not include the vehicle pattern information;
storing the vehicle pattern information collected from the vehicle in the first mobile device;
discovering a second mobile device when the vehicle pattern information collected from the vehicle does not correlate with second pattern information including information relating to driving of the vehicle or to manipulation of the vehicle stored in the first mobile device; and
when the second mobile device is discovered, stopping the electric device from communicating with the first mobile device.

13. An apparatus in a vehicle, comprising:
a communication unit, wherein the apparatus communicates with a first mobile device via the communication unit;
a controller configured to collect first pattern information including information relating to driving of the vehicle or to manipulation of the vehicle from the vehicle; and
a memory configured to store the first pattern information,
wherein the controller is further configured to compare the first pattern information collected from the vehicle with second pattern information including information relating to driving of the vehicle or to manipulation of the vehicle stored in the first mobile device, discover a second mobile device when the first pattern information collected from the vehicle does not correlate with the second pattern information stored in the first mobile device, and when the second mobile device is discovered, control the communication unit to stop the communication with the first mobile device.

14. The apparatus according to claim 13, wherein the controller, when the second mobile device is discovered, is further configured to establish communication with the second mobile device, compare the first pattern information with third pattern information stored in the second mobile device, and maintain the established communication with the second mobile device based on the comparison of the first pattern information with the third pattern information.

15. The apparatus according to claim 14, wherein the controller, when the first pattern information is correlated with the third pattern information, is further configured to update the third pattern information based on information collected while the vehicle runs or stops.

16. The apparatus according to claim 13, wherein the first pattern information includes driving pattern information and manipulation pattern information.

17. The apparatus according to claim 16, wherein the driving pattern information includes at least one of: a destination inputted to an audio-video-navigation device, information of an area adjacent to a driving route, an operation mode of the audio-video-navigation device on the driving route, a driving speed, an accelerator manipulation pattern, and a break manipulation pattern.

18. The apparatus according to claim 16, wherein the manipulation pattern information includes at least one of: integrated memory system (IMS) information, power steering wheel setting information, and mirror setting information.

19. The apparatus according to claim 16, wherein the controller, when the driving pattern information and the manipulation pattern information are beyond predetermined standards, is further configured to recognize that the first pattern information and the second pattern information are uncorrelated.

20. The apparatus according to claim 13, further comprising a display unit,
wherein the controller, when the second mobile device is undiscovered, is further configured to provide a message questioning whether the second mobile device is in the vehicle on the display unit.

21. An apparatus in a vehicle, comprising:

a communication unit, wherein the apparatus communicates with a first mobile device via the communication unit; and a controller configured to register the first mobile device and collect vehicle pattern information including information relating to driving of the vehicle or to manipulation of the vehicle from the vehicle when the first mobile device is available for communicating with the electric device and the first mobile device does not include the vehicle pattern information, wherein the controller is further configured to control the communication unit to store the vehicle pattern information collected from the vehicle in the first mobile device, discover a second mobile device when the vehicle pattern information collected from the vehicle does not correlate with second pattern information including information relating to driving of the vehicle or to manipulation of the vehicle stored in the first mobile device, and when the second mobile device is discovered, control the communication unit to stop the communication with the first mobile device.

* * * * *